United States Patent Office 2,807,650

Patented Sept. 24, 1957

2,807,650

1,1,3-TRIMETHYLINDANE-3-HYDROPEROXIDE

William Webster, Falkirk, and Donald Peter Young, Sanderstead, England, assignors, by mesne assignments, to Hercules Powder Company, a corporation of Delaware No Drawing. Application June 10, 1955, Serial No. 514,684

Claims priority, application Great Britain June 11, 1954

5 Claims. (Cl. 260—610)

This invention relates to the 1,1,3-trimethylindane-3-hydroperoxide and a novel process for its production.

1,1,3-trimethylindane-3-hydroperoxide may be readily produced by the oxidation of 1,1,3-trimethylindane in the liquid phase with molecular oxygen at elevated temperatures. The oxidation may be carried out by passing molecular oxygen or oxygen-containing gases such as air through the hydrocarbon starting material in the dry state or in a dispersion or emulsion thereof in water. In general, the oxidation may be carried out at temperatures between about 50° and about 130° C. This temperature range is particularly useful when the oxidation is effected under anhydrous conditions. When the oxidation is carried out in the presence of an aqueous phase, which may be water per se or an aqueous alkali, the preferred temperature range is between about 50° and about 110° C. Temperatures up to about 130° C. may be utilized when an aqueous phase is present, but under these conditions, it is necessary to apply pressure.

The oxidation of 1,1,3-trimethylindane proceeds rapidly at a temperature of about 90° C. and is advantageously carried out in the presence in the liquid reaction mixture of small amounts of alkaline stabilising agents such as the alkali metal hydroxides, carbonates, bicarbonates, and acetates. Also useful are alkaline stabilizing agents such as calcium oxide, calcium hydroxide, and calcium carbonate. Those alkaline stabilising agents which are water-soluble may be dissolved in the water used when the oxidation is carried out in the presence of an aqueous phase. When the oxidation is effected under anhydrous conditions the alkaline stabilising agents may be added in finely divided solid form and maintained in dispersion in the reaction mixture by agitation. They also may be added in an anhydrous oxidation in the form of a concentrated solution in water provided the oxidation is carried out at a temperature at which the water is flashed off.

That the hydroperoxide of 1,1,3-trimethylindane should be readily formed at a high rate and with a high efficiency regarding the conversion of the oxygen into the hydroperoxide, even in the presence of alkaline substances, is surprising since it was known that hydroperoxides of compounds which possess a tertiary carbon atom in proximity to an aromatic ring and forming part of a non-aromatic ring, to which carbon atom is linked a lower alkyl group, such as 1-methyltetrahydronaphthalene are very sensitive towards heat and alkali (see Hock, Depke and Knauel, Ber. 83, page 238 (1950)) so that even at temperatures of about 60° C., substantial amounts of the hydroperoxide formed were decomposed and converted into the corresponding carbinol. The readiness with which the oxidation of the 1,1,3 - trimethylindane takes place is, furthermore, unexpected since o-diisopropylbenzene is known to be oxidized with very great difficulty only and the trimethylindane may be considered as the simple cyclization product thereof. Nor could it be predicted in which position in the non-aromatic ring the oxygen would attach itself.

The 1,1,3-trimethylindane-3-hydroperoxide may be recovered and isolated from the reaction mixture by treating the oxidation reaction mixture with an aqueous sodium hydroxide solution of fairly high concentration, for example, 25%, whereupon the sodium salt of the hydroperoxide crystallises out. From the sodium salt the free hydroperoxide may be obtained by addition of water or by neutralising or acidifying, for instance, with carbon dioxide. As an alternative, the 1,1,3-trimethylindane-3-hydroperoxide may be recovered from the reaction mixture by adding thereto petroleum ether (B. P. 40–60° C.) which precipitates the hydroperoxide. The filtered solution may then be fractionally distilled for the recovery of unreacted 1,1,3-trimethylindane. Since 1,1,3-trimethylindane is obtained as a by-product in the reaction of propylene with benzene or isopropylbenzene in the presence of aluminium chloride catalyst to produce mono- or di-isopropylbenzene, respectively, which compounds are used on a large scale as starting materials to produce the corresponding phenols, the 1,1,3-trimethylindane has become easily accessible and thus forms an inexpensive starting material for the production of the hydroperoxide of this invention.

The 1,1,3-trimethylindane-3-hydroperoxide, which has not been described before, is a crystalline solid melting at 38.5–40° C. It begins to decompose at 165° C.

The 1,1,3-trimethylindane-3-hydroperoxide may be used with good effect as catalyst for the polymerisation, for instance, of styrene, with which it produced almost complete polymerisation after 24 hours at 100° C., when used in a concentration of only 1 part of the hydroperoxide to 1,000 parts by volume of styrene. The hydroperoxide equivalent as estimated by iodine titration was found to be 191 (calculated 192). Elementary analysis found C 74.6, 74.7; H 8.1, 8.1 (calculated for $C_{12}H_{16}O_2$: C 75.0, H 8.4). The hydroperoxide is insoluble in water, readily soluble in most organic solvents, soluble in warm light petroleum (B. P. 40–60° C.) from which it crystallises on cooling in long fine needles. Of even greater importance is the fact that the hydroperoxide may be decomposed by means of an acidic condensation catalyst to produce 2,4,4-trimethylchroman-2-ol and its dehydration product 2,4,4-trimethylchromen-2, as described with more particularity in our copending U. S. application No. 514,685, filed June 10, 1955. The 2,4,4-trimethylchroman-2-ol is a white crystalline solid, melting point 88.3–90° C., which can readily be etherified and forms a useful intermediate for the production of fungicides, insecticides and other chemical compounds of value; whilst the 2,4,4-trimethylchromen, which is a liquid boiling between 96° and 104° C./12 mm., $n_D^{20}$ 1.5300 to 1.5302, on account of its reactive double bond also forms an intermediate for the formation of other useful chemicals.

The following examples serve to illustrate the process of the present invention and the hydroperoxide produced thereby. The parts by weight have the same relationship to parts by volume as kilograms to litres.

*Example 1*

100 parts by weight of 1,1,3-trimethylindane of 96% molar purity and containing a small amount of ortho-diisopropylbenzene as impurity was oxidised at 90° C. in the presence of 25 parts by volume of a 2.4% weight/volume aqueous sodium carbonate solution. The oxidation was carried out with commercial oxygen. Although no initiator was used, no appreciable induction period was observed and in the first 30 minutes 320 parts by volume of oxygen at normal temperature and pressure was absorbed. Thereafter the rate of oxygen absorption increased and was at a maximum between 1½ and 3 hours when 1,950 parts by volume of oxygen per hour were absorbed. The rate of hydroperoxide formation was similarly at a maximum during the stated period and amounted to 14.4% weight/weight trimethylindane hydroperoxide per hour. After 3 hours the rates of oxygen absorption and hydroperoxide formation gradually decreased and the experiment was terminated after 5 hours, when a total of 7,380 parts by volume (N. T. P.) of oxygen had been absorbed to give a product containing 53.1% weight/weight of 1,1,3-trimethylindane-3-hydroperoxide. This corresponds to a hydroperoxide efficiency based on oxygen of 92.4% of theory.

The reaction mixture was diluted with 50 parts by volume of light petroleum (B. P. 40–60° C.) and the aqueous phase separated and rejected. The organic phase was then treated with 24 parts by weight of sodium hydroxide, dissolved in the smallest possible volume of water, with stirring and cooling. After keeping for 18 hours at 0° C., the sodium salt of the hydroperoxide had separated as a thick precipitate. This was filtered off with suction, and was washed free from unchanged trimethylindane and oxidation by-products by slurrying three times with light petroleum (B. P. 40–60° C.) and filtering. The sodium salt was reconverted into the hydroperoxide by adding to water and light petroleum (B. P. 40–60° C.) and passing carbon dioxide until neutral. The light petroleum solution was separated, washed with water, dried with anhydrous sodium sulphate, and evaporated to a volume of about 150 parts. On cooling to −30° C., the hydroperoxide crystallised out and was filtered off. Further amounts were obtained by concentrating the mother-liquors and cooling again. The recovery of hydroperoxide was 84% of that originally present in the reaction mixture, and the main crop was 98.3% pure by titration.

30 parts by weight of the isolated hydroperoxide which had a purity of 84.5%, were dissolved in 50 parts by volume of acetone and added gradually over a period of 13 minutes to a solution of 1 part by volume of concentrated sulphuric acid in 250 parts by volume of acetone under reflux. The reaction was quite vigorous. The mixture was refluxed for a further 10 minutes after which only a trace of hydroperoxide was left in the mixture. The mixture was cooled and stirred with excess solid magnesia until a pH of 6.5 was obtained on diluting a test portion with water. The solution was filtered and the acetone distilled off under reduced pressure. The residue was taken up in benzene, washed with water and the benzene then evaporated under reduced pressure. The residue was obtained as a light yellow oil which partially crystallised on cooling. It was dissolved in petroleum ether (boiling between 60 and 80° C.) by boiling and on cooling a white crystalline product was obtained in a yield of 11.3 parts by weight. It had a melting point between 86 and 88° C. On recrystallization from petroleum ether and drying at 1 to 2 millimetres pressure it had a melting point of 88.3 to 89° C.

The petroleum ether filtrate from the first crystallisation was distilled to remove the solvent and the residual yellow oil fractionally distilled under reduced pressure. Three cuts were recovered, the first boiling between 98 and 104° C./12 mm. and weighing 5.1 parts and a second boiling between 104 and 120° C. under the same pressure and weighing 3.2 parts. These two cuts remained liquid on standing and consisted of the 2,4,4-trimethylchromen. A third fraction boiled between 122 and 144° C. also at 12 mm. and amounted to 3.1 parts by weight. The third fraction crystallised almost entirely. A further 2.9 parts solid remained in the kettle and the condenser. There was thus obtained with the previously recovered 11.3 parts a total of about 17.3 parts by weight of the solid product, which consisted of 2,4,4-trimethylcroman-2-ol, and 8.3 parts by weight of the liquid product which consisted of 2,4,4-trimethylcromen, contaminated with small amounts of 1,3,5-trimethylindene, which could be separated by a further fractional distillation.

*Example 2*

400 parts by weight of trimethylindane, which as a consequence of atmospheric oxidation already contained the equivalent of 23.5 parts by weight of the hydroperoxide, was oxidised with oxygen at 90° C. in the presence of 5 parts by weight of calcium hydroxide. The miximum rate of absorption was attained in half an hour, when 8100 parts by volume of oxygen (N. T. P.) per hour were absorbed. The experiment was terminated after 4 hours, when a total of 28,310 parts by volume of oxygen had been absorbed. The product contained 265 parts by weight of trimethylindane hydroperoxide, which corresponds to an almost theoretical efficiency of conversion of oxygen to the hydroperoxide.

*Example 3*

400 parts by weight of trimethylindane (93% pure and almost peroxide-free) was oxidized with air at 120° C. in the presence of about 0.5 part by weight of saturated sodium hydroxide solution. A trap was provided on the reflux to the apparatus to retain any water which distilled out of the reaction mixture. The maximum rate of absorption, reached after 2 hours, was 5060 parts by volume (N. T. P.) per hour. The experiment was terminated after 7 hours, when a total of 27,100 parts by volume of oxygen had been absorbed from the air passed. The product contained 121 parts by weight of trimethylindane hydroperoxide, corresponding to 51% efficiency of conversion of oxygen to hydroperoxide.

We claim:

1. As a new product, 1,1,3-trimethylindan-3-hydroperoxide.

2. The process of producing 1,1,3-trimethylindan-3-hydroperoxide which comprises passing molecular oxygen into 1,1,3-trimethylindane in the liquid phase at a temperature between about 50° C. and about 130° C.

3. The process of claim 2 wherein the oxidation is carried out under anhydrous conditions.

4. The process of claim 2 wherein the oxidation is carried out in the presence of water.

5. The process of claim 2 wherein the oxidation is carried out in the presence of an alkaline reacting substance.

References Cited in the file of this patent

UNITED STATES PATENTS 2,430,864 Farkas et al. ............ Nov. 18, 1947